United States Patent
Dugan

(10) Patent No.: US 8,887,151 B2
(45) Date of Patent: Nov. 11, 2014

(54) SYSTEMS AND METHODS FOR MANAGING UPDATES TO APPLICATIONS INSTALLED ON ELECTRONIC DEVICES

(71) Applicant: Motorola Mobility LLC, Libertyville, IL (US)

(72) Inventor: Regina Elvira Dugan, Los Altos, CA (US)

(73) Assignee: Google Inc., Mountain View, CA (US)

( * ) Notice: Subject to any disclaimer, the term of this patent is extended or adjusted under 35 U.S.C. 154(b) by 39 days.

(21) Appl. No.: 13/715,272

(22) Filed: Dec. 14, 2012

(65) Prior Publication Data
US 2014/0173586 A1 Jun. 19, 2014

(51) Int. Cl.
*G06F 9/44* (2006.01)

(52) U.S. Cl.
USPC ............................ 717/173; 717/172; 717/174

(58) Field of Classification Search
USPC .................................. 717/169–178; 709/203
IPC .................................................. G06F 8/61,8/65
See application file for complete search history.

(56) References Cited

U.S. PATENT DOCUMENTS

| | | | | |
|---|---|---|---|---|
| 6,029,175 | A * | 2/2000 | Chow et al. ........................... | 1/1 |
| 6,606,744 | B1 * | 8/2003 | Mikurak ....................... | 717/174 |
| 7,149,789 | B2 * | 12/2006 | Slivka et al. ................... | 709/219 |
| 7,150,015 | B2 * | 12/2006 | Pace et al. ...................... | 717/176 |
| 7,254,608 | B2 * | 8/2007 | Yeager et al. ................. | 709/203 |
| 7,305,672 | B2 * | 12/2007 | Vincent ......................... | 717/172 |
| 7,512,940 | B2 * | 3/2009 | Horvitz ......................... | 717/173 |
| 7,584,467 | B2 * | 9/2009 | Wickham et al. ............. | 717/171 |
| 7,614,052 | B2 * | 11/2009 | Wei .............................. | 717/176 |
| 7,716,286 | B2 * | 5/2010 | Heins et al. .................... | 709/204 |
| 8,074,214 | B2 * | 12/2011 | Isaacson et al. .............. | 717/173 |
| 8,112,747 | B2 * | 2/2012 | Haeberle et al. ............. | 717/172 |
| 8,150,911 | B2 * | 4/2012 | Bell et al. ....................... | 709/203 |
| 8,347,285 | B2 * | 1/2013 | Branch et al. ................. | 717/177 |
| 8,543,998 | B2 * | 9/2013 | Barringer ...................... | 717/175 |
| 8,555,273 | B1 * | 10/2013 | Chia et al. ..................... | 717/173 |
| 8,726,267 | B2 * | 5/2014 | Li et al. ......................... | 717/173 |

OTHER PUBLICATIONS

Herrick et al, "Sustainable Automated Software Deployment Practices", ACM, pp. 189-196, 2013.*
Edlund, A Software Package for Sparse Orthogonal Factorization and Updating, ACM Transactions on Mathematical Software, vol. 28, No. 4, pp. 448-482, 2002.*
Perrouin et al, "Towards Flexible Evolution of Dynamically Adaptive Systems", IEEE, pp. 1353-1356, 2012.*
Larson et al, "Securing Vehicles against Cyber Attacks", ACM, pp. 1-3, 2008.*
Reach Unlimited Corporation, "Trapster", www.trapster.com, printed Dec. 12, 2012, 9 pages.
Google Inc., "Temple Run: Brave—Android Apps on Google Play", https://play.google.com/store/apps/details?id=com.disney.brave_ google&feature=more_from_develop . . . , printed Nov. 20, 2012; 2 pages.

* cited by examiner

*Primary Examiner* — Anil Khatri

(74) *Attorney, Agent, or Firm* — Marshall, Gerstein & Borun LLP

(57) ABSTRACT

Systems and methods are provided for leveraging recommendations to determine whether to download certain application updates. According to certain aspects, an electronic device retrieves (710) a recommendation for an update to an application installed on the electronic device. The electronic device annunciates (730) an indication of the recommendation and receives (745) an instruction to download the update from an application server. Further, the electronic device requests (755) the update from the application server, receives (760) the update from the application server, and installs (765) the update on the electronic device.

20 Claims, 7 Drawing Sheets

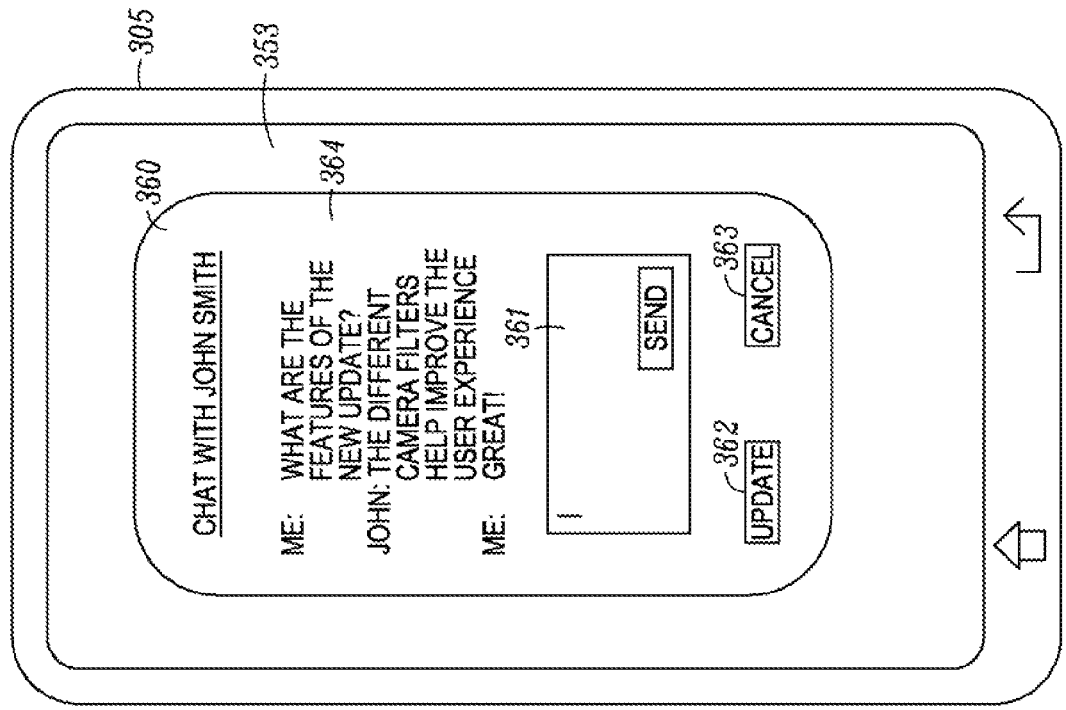
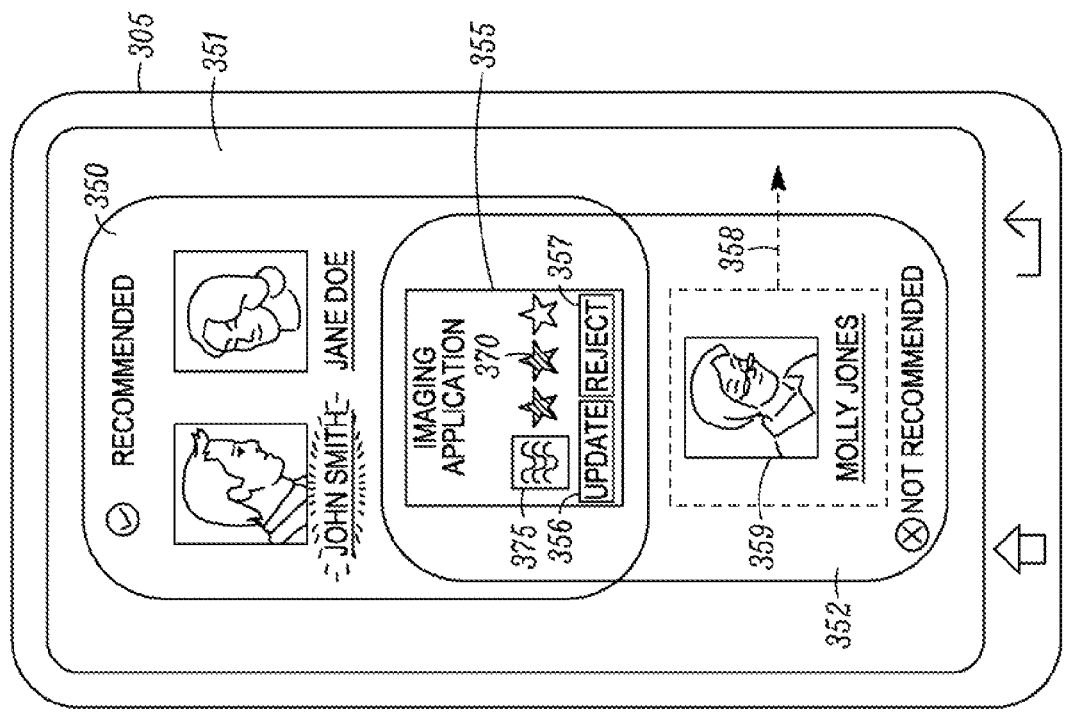
FIG. 3B
FIG. 3A

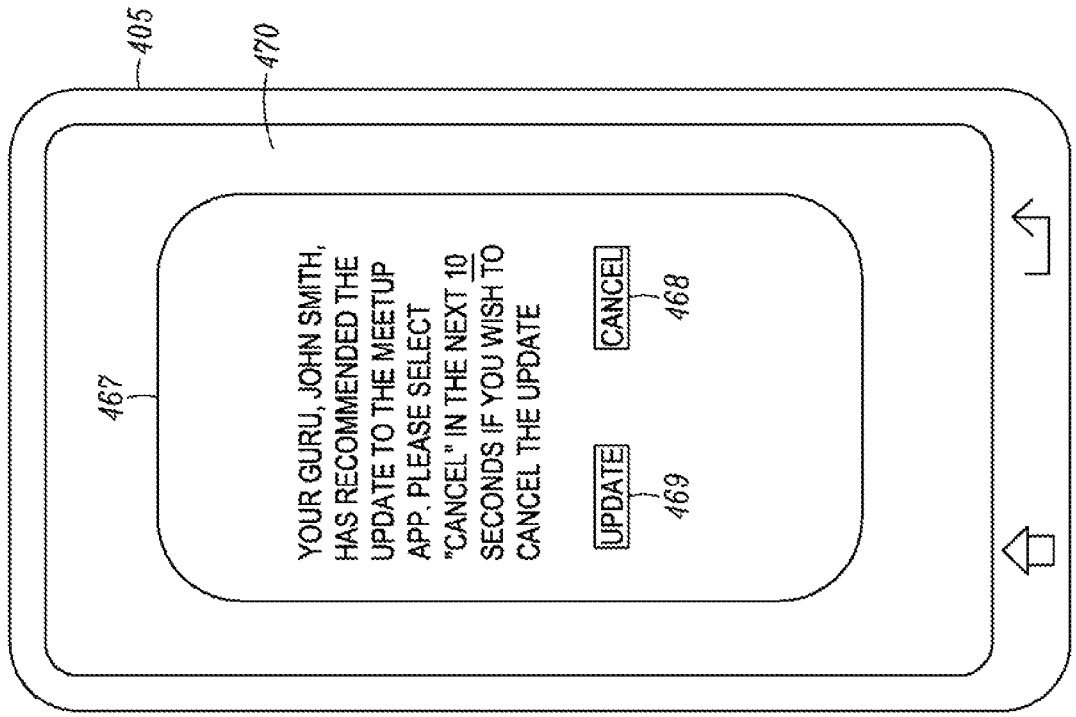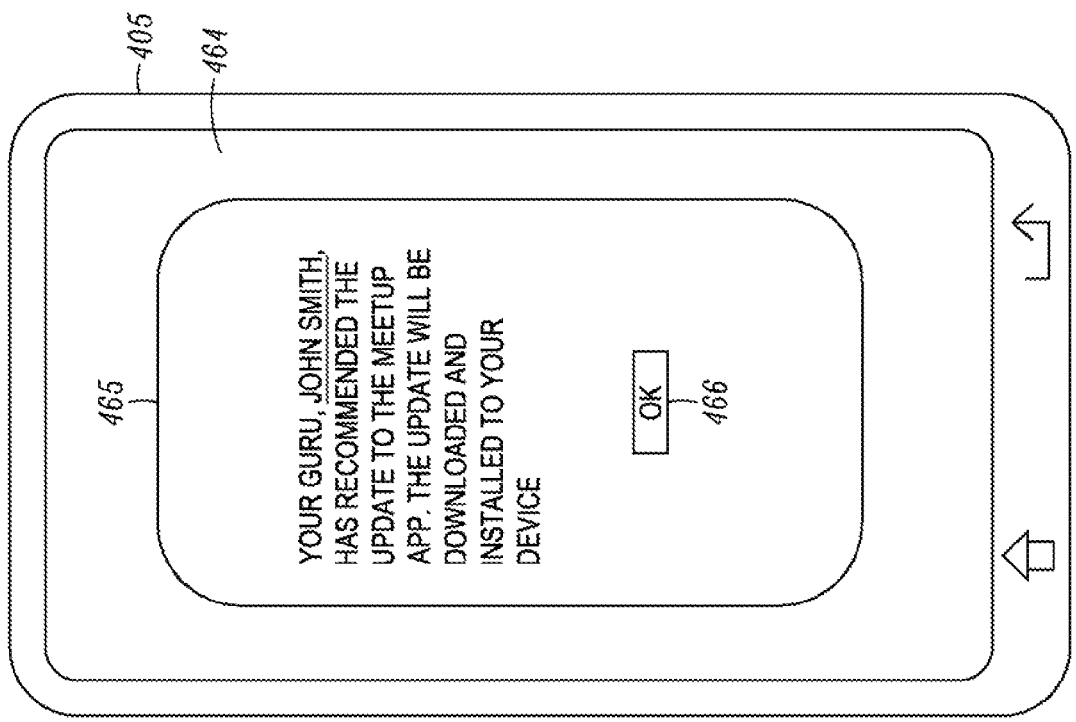
FIG. 4B
FIG. 4A

SYSTEMS AND METHODS FOR MANAGING UPDATES TO APPLICATIONS INSTALLED ON ELECTRONIC DEVICES

FIELD

This application generally relates to updating applications installed on electronic devices. In particular, the application relates to platforms and techniques for enabling electronic devices to leverage recommendations to determine whether to obtain or update applications installed on the electronic devices.

BACKGROUND

Various existing distribution platforms enable users to download and install various applications to electronic devices. For example, Google Inc. maintains the Google Play platform that enables users to browse and download applications as well as other types of media. Various developer entities and individuals that offer applications via the distribution platforms can also release updates to the applications, such as in response to user feedback, feature improvements, and operating system updates. If a particular electronic device has installed a certain application and an update for the application is available, the electronic device can access the distribution platform to download the update (e.g., as software code) and locally install the update. The electronic devices can also indicate to users that certain updates are available for installation.

With the number of available applications increasing, users can sometimes download applications that the users may not frequently access or use. Further, users sometimes do not know whether to accept an application update or may need reassurance that downloading the application or application update is worthwhile. For example, some users may not know whether the application or the application update is unauthorized, likely to damage the electronic device, unnecessary, or otherwise undesirable.

Many distribution platforms include ratings and user reviews for each application (and update) that provide information such as a total number of reviews, an average rating, a breakdown of ratings, and user comments. Although this information is generally helpful, it can be difficult to interpret, time-consuming to analyze, and inconclusive for a particular user's decision on whether to update an application. Accordingly, there is an opportunity to support a decision-making process for gauging whether an application update is useful or otherwise recommended for an individual user.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed embodiments, and explain various principles and advantages of those embodiments.

FIGS. 3A and 3B depict example interfaces associated with downloading application updates in accordance with some embodiments.

FIGS. 4A and 4B depict example interfaces associated with downloading application updates in accordance with some other embodiments.

DETAILED DESCRIPTION

Figure 1:
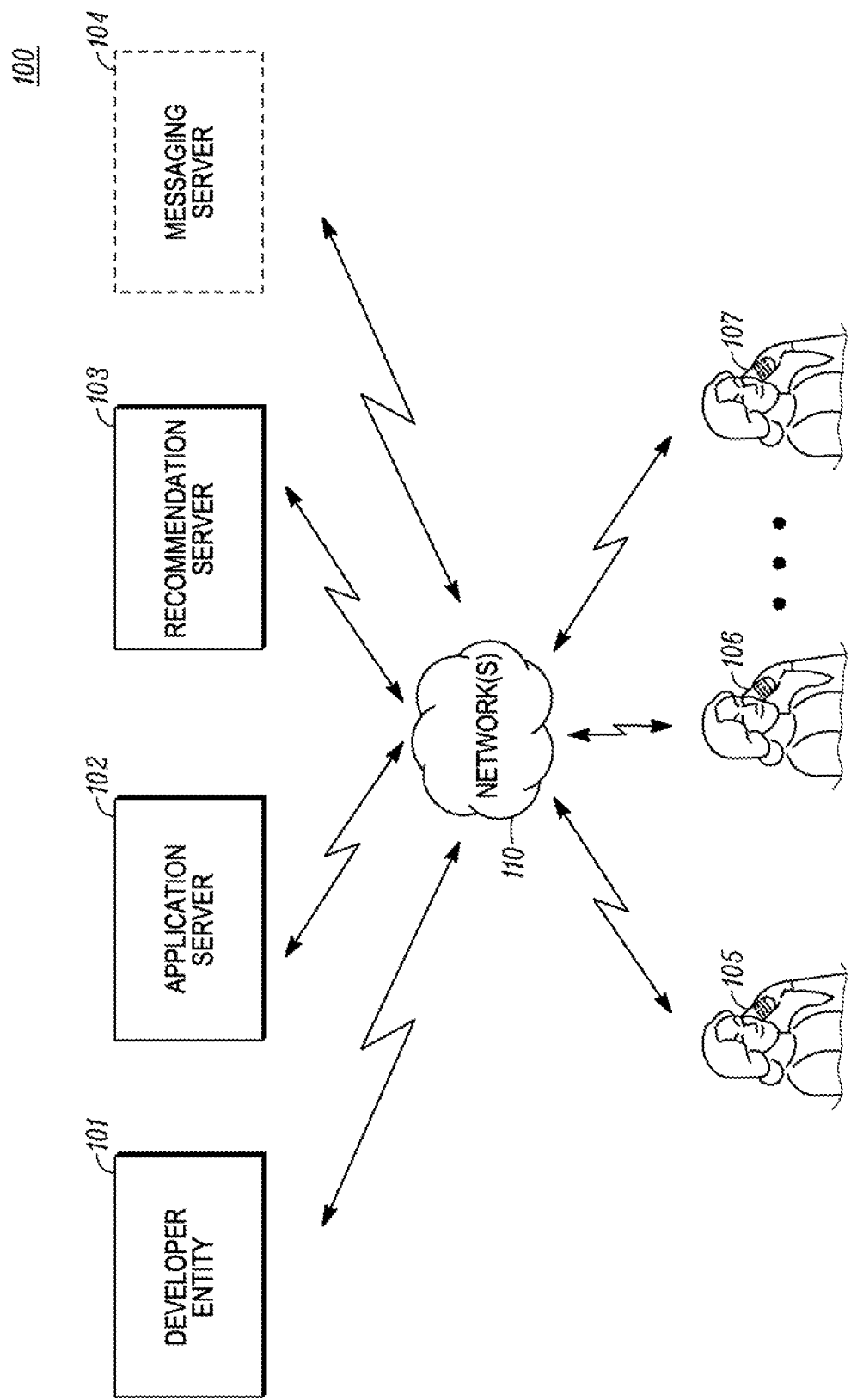
FIG. 1 illustrates an example environment including various components for facilitating the download of application updates in accordance with some embodiments.

Systems and methods enable an electronic device to efficiently and effectively download certain updates to applications installed on the electronic device and reject other updates. According to embodiments, the electronic device can receive a notification from an application server indicating that an update for an application installed on the electronic device is available for download via the application server. The electronic device can interface with a recommendation network to retrieve a recommendation for the update. In some cases, the recommendation can be from one or more recommenders who are selected by or otherwise associated with a user of the electronic device. The electronic device can examine the recommendations from the recommenders to determine whether to download the application update. In some embodiments, the user of the electronic device can review the recommendations and manually select to download or reject the application update. Additionally, one or more recommenders may provide positive and/or negative endorsements for downloading new software applications based on previously downloaded or updated software applications.

In some cases, the user of the electronic device can indicate one of the recommenders as the recommender who most influenced the user's decision to download or reject a particular application update. When the user relies on a particular recommender's opinions a certain amount, that recommender may become a trusted recommender. In additional variations, the user of the electronic device can specify a guru for updating purposes. If the trusted recommender or guru positively recommends the application update, the electronic device can automatically download and install the application update without user interaction.

The electronic device may support manual or automatic download or rejection of application updates based on whether the recommender is a trusted recommender or guru, whether any recommendation is positive or negative, the split of positive and negative recommendations, the total number of positive recommendations, the total number of negative recommendations, or other factors. The electronic device can send associated recommendation activity data to the recommendation network whereby the recommendation network can maintain data related to recommenders' levels of influence. For example, the recommendation activity data may include the number of times a recommender is selected by other users as an influencing recommender, the number of users that have designated a recommender as a trusted recommender. In some cases, the recommendation network can send recommendation activity data to an application developer whereby the application developer can provide certain benefits and incentives to various recommenders based on the recommendation activity data.

The systems and methods offer a benefit to users by enabling the users to gauge recommendations for certain application updates and by enabling user devices to automatically download the application updates even though the users may not know whether such application updates are needed, helpful, or otherwise desired. By selecting recommenders rather than reviewing a catalog of random reviews, a user is better able to make judgments about the desirability of software updates. Also, in some cases, the user is not interrupted by update notifications, and software updates are automatically downloaded or rejected based on recommender input and without any user interaction. Further, the systems and methods enable certain recommenders to provide recommendations to their contacts, followers, or connections, and to receive certain benefits and incentives for providing such recommendations. Moreover, the systems and methods enable application developers to receive relevant feedback for their application updates from users who tend to be early adopters and trusted recommenders of the application updates.

FIG. 1 depicts an environment 100 including various components and entities configured to facilitate the functionalities as described herein. It should be appreciated that the environment 100 is merely an example and can include fewer or more components and entities, as well as other various combinations of components and entities.

As shown in FIG. 1, the environment 100 includes electronic devices 105, 106, 107 configured for use by respective users. Further, the environment 100 includes a developer entity 101, an application server 102, a recommendation server 103, and an optional messaging server 104. The electronic devices 105, 106, 107 can connect to and communicate with any of the developer entity 101, the application server 102, the recommendation server 103, and the messaging server 104 via a network 110 such as, for example, a wide area network (WAN), a local area network (LAN), a personal area network (PAN), or other networks. The network 110 can facilitate any type of data communication via any wired or wireless standard or technology (e.g., GSM, CDMA, TDMA, WCDMA, LTE, EDGE, OFDM, GPRS, EV-DO, UWB, IEEE 802 including Ethernet, WiMAX, WiFi, Bluetooth, and others). It should be appreciated that each of the developer entity 101, the application server 102, the recommendation server 103, and the messaging server 104 can connect to and communicate with each other, for example via the network 110. Similarly, each of the electronic devices 105, 106, 107 can connect to and communicate with each other, for example via the network 110 or via peer-to-peer communication.

The components of the environment 100 can implement the systems and methods that facilitate and manage the application updating functionalities. As shown in FIG. 1, there are three electronic devices 105, 106, 107, although it should be appreciated that the functionalities can be implemented with other amounts of electronic devices. According to embodiments, the electronic devices 105, 106, 107 can be associated with each other. In certain aspects, the electronic devices 105, 106, 107 and/or the users thereof can be associated to each other via the recommendation server 103. More particularly, the recommendation server 103 can implement a recommendation network service whereby the users of the electronic devices 105, 106, 107 can be "connected" to one or more recommenders, "following" one or more recommenders, or otherwise be members of a common group via the recommendation network service. This recommendation network service may be based in part upon existing social and professional networks of the user as reflected in social networking accounts of the user such as those in Facebook® by Facebook, Inc., Twitter® by Twitter, Inc., Google+™ by Google, Inc., LinkedIn® by LinkedIn Corporation., Orkut ™ by Google, Inc., MySpace® by Myspace LLC, Classmates.com by MemoryLane, Inc., CaringBridge.org by CaringBridge®, and others.

In some cases, the electronic devices 105, 106, 107 can support selection of recommenders from a contacts list (such as a locally-stored contacts list or a network-stored contacts list) or other similar listing. It should be appreciated that other types of associations between and among the electronic devices 105, 106, 107 and recommenders are envisioned. Note that individual users of the electronic devices 105, 106, 107 may be recommenders to other users. Recommenders may also be non-human entities such as groups of individuals, corporations, and professional review organizations.

The developer entity 101 can be any company, group, individual, partnership, enterprise, entity, or the like that can develop and release applications and updates thereof. For example, the applications can be social networking applications, personalization applications, imaging applications, utility applications, productivity applications, news applications, games, and/or other types of applications. The application server 102 can be any combination of hardware and software that is configured to offer applications for download by electronic devices, such as the electronic devices 105, 106, 107. For example, the application server can be the Google Play® distribution service. According to embodiments, the developer entity 101 can submit or otherwise provide an application to the application server 102 for approval and/or for availing for download. Further, the developer entity 101 can submit or otherwise provide updates to applications that the application server 102 already offers for download. For example, if the application server 102 offers version 1.0 of a certain application, the developer entity 101 can provide version 1.1 of the certain application to the application server 102. Each of the electronic devices 105, 106, 107 can access the application server 102 to download and install desired applications as well as updates to the applications. In particular, one or more of the electronic devices 105, 106, 107 may download and install a certain application, such as an application of the developer entity 101. If the developer entity 101 submits an update to the application to the application server 102, one or more of the electronic devices 105, 106, 107 may download the update from the application server 102 and install the update.

In certain cases, respective users of one or more of the electronic devices 105, 106, 107 may not know whether to accept a software update, or whether to decline the update as being unauthorized, likely to cause damage, unnecessary, or otherwise undesirable, among other concerns. According to embodiments, one or more of the electronic devices 105, 106, 107 can interface with the recommendation server 103 to retrieve recommendations for updates to applications installed on the one or more of the electronic devices 105, 106, 107. Further, the one or more of the electronic devices 105, 106, 107 can examine the recommendations to determine whether to download the application updates. In some cases, the one or more of the electronic devices 105, 106, 107 can interface with the messaging server 104 to initiate a chat session or other messaging platform with one of the recommenders who provided a recommendation. The one or more of the electronic devices 105, 106, 107 can retrieve any selected application updates from the application server 102.

Figure 2:
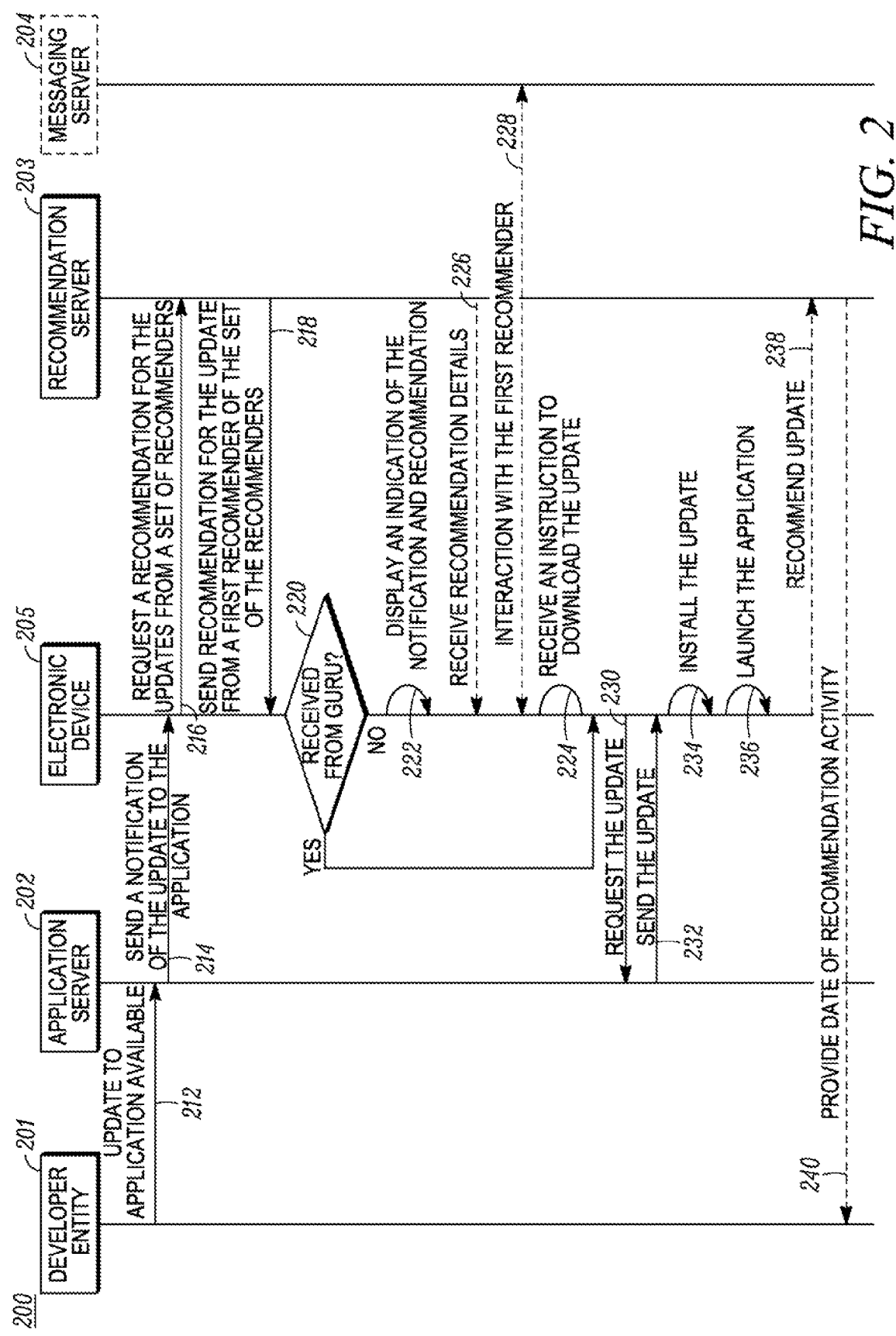
FIG. 2 depicts a diagram for downloading application updates in accordance with some embodiments.

A diagram 200 illustrating various embodiments is depicted in FIG. 2. As shown, the diagram 200 includes an electronic device 205 (such as the electronic device 105 as discussed with respect to FIG. 1), a developer entity 201 (such as the developer entity 101 as discussed with respect to FIG. 1), an application server 202 (such as the application server 102 as discussed with respect to FIG. 1), a recommendation server 203 (such as the recommendation server 103 as discussed with respect to FIG. 1), and an optional messaging server 204 (such as the messaging server 104 as discussed with respect to FIG. 1).

According to embodiments, the developer entity 201 can provide (212) an update to an application to the application server 202, wherein the application server 202 can already avail a prior version of the application for download. In some implementations, the application server 202 can determine that the electronic device 205 has installed a prior version of the application. The application server 202 can send (214) a notification of the update to the application to the electronic device 205. Responsive to receiving the notification, the electronic device 205 can request (216) the recommendation server 203 to provide a recommendation for the update from a set of recommenders. According to embodiments, a user of the electronic device 205 can be connected to or otherwise associated with the set of recommenders via a social network, a professional network, an employer network, an accessible contact list, or similar feature of the recommendation server 203. In some cases, the user of the electronic device 205 can select and de-select individual or groups of recommenders from the set of recommenders.

One or more of the set of recommenders can provide a recommendation (e.g., "recommended"/"not recommended", "thumbs up"/"thumbs down", etc.) and the recommendation server can send (218) a recommendation for the update from a first recommender of the set of recommenders. The recommendation may also involve an endorsement for another application based on the request (216). It should be appreciated that the recommendation server 203 can request recommendations from the set of recommenders and the set of recommenders can provide recommendations according to any convention (e.g., direct messaging, a pop-up notification, a dedicated recommendation page accessible via a website, mobile application, and/or the like, etc.).

In some embodiments, the electronic device 205 can examine the received recommendation to determine if the recommendation is sufficient or insufficient. For example, the recommendation can be insufficient if it includes too few ratings from too few of the set of recommenders. For further example, the recommendation can be insufficient if it does not include a recommendation from a trusted recommender. It should be appreciated that additional scenarios in which the electronic device 205 can deem the recommendation sufficient or insufficient are envisioned. If the electronic device 205 determines that the recommendation is insufficient, the electronic device 205 can suppress any annunciating or displaying of the update notification or recommendation, and can request additional recommenders of the set of recommenders to provide recommendations for the update. In some cases, the user of the electronic device 205 can explicitly select an option (e.g., "Ask My Friends") to retrieve additional recommendations from the set of recommenders. Further, the electronic device 205 can receive one or more recommendations from one or more of the additional recommenders, and can repeat these described functionalities until the received recommendation(s) is sufficient.

The electronic device 205 can determine (220) if the recommendation is from a guru or trusted recommender. In embodiments, the user of the electronic device 205 can specify one or more gurus or develop one or more trusted recommenders whereby the electronic device 205 can assign recommendations from such a guru or trusted recommender more weight than recommendations from other non-trusted recommenders. Note that gurus are a specific type of trusted recommender. For example, a user may designate a tech-savvy relative, friend, or co-worker as a guru. The guru may be someone with the same model of electronic device who tends to use many of the same software applications as the user. In addition to humans as gurus, a guru may be a corporate entity, a technology reviewer, a publication, or a website. In some cases, the recommendation server 203 can assign a recommender as a trusted recommender if that electronic device user has relied on that recommender a certain number of times. Thus, a guru may be designated without considering any recommendation interactions with the electronic device. A particular recommender may lose guru status if the user decides to remove that recommender as a guru. A trusted recommender who is not a guru may lose that status if the parameters of non-guru trusted recommender change (e.g., the most recent indication of reliance by the user is no longer within a certain time frame, the percentage breakdown of relying on that recommender changed with respect to other recommenders, etc.).

If the recommendation is not from a guru or trusted recommender ("NO"), the electronic device 205 can display (222), in a user interface, an indication of the notification and the recommendation. In embodiments, the electronic device 205 can display indications of any positive recommendations, any negative recommendations, and identifications of the corresponding recommenders of the set of recommenders. For example, if Recommender B positively recommends the update and Recommender C negatively recommends the update (i.e., does not recommend the update), the electronic device 205 can display ratings (i.e., the negative recommendation and the positive recommendation) along with identifications of Recommender B and Recommender C.

The electronic device 205 optionally provides (226) details of recommendations from the set of recommenders as received from the recommendation server 203. For example, the details may include full user reviews from one or more recommenders from the set of recommenders, excerpts from a selected recommender's user review (e.g., the user double-clicks Recommender B's image and receives Recommender B's user review highlights), full user reviews from all recommenders who provided a negative recommendation (e.g., the user selects a graphical element representing all negative recommendations and receives all user reviews from recommenders who provided a negative recommendation), partial user reviews from all recommenders who provided a positive recommendation (e.g., the user selects a graphical element representing all positive recommendations and receives excerpts of user reviews from recommenders who provided a positive recommendation), etc.

The electronic device 205 can also display options to download the update or reject the update. As shown in FIG. 2, the electronic device 205 can receive (224) an instruction from the electronic device user to download the update. Particularly, the user of the electronic device can select an option displayed in the user interface to download the update. According to embodiments, the instruction can optionally include an identification of a recommender that the user can select. In these embodiments, the user can select to download the update (or reject the update) by selecting an identification of one of the recommenders that the electronic device 205 displays in the interface. For example, the user may select the recommender as one who influenced the user's decision to download or reject the update. In these embodiments, the electronic device 205 can monitor or record an amount of times that a particular recommender has been selected. If the amount of times meets or exceeds a predetermined threshold (e.g., 10 times), then the electronic device 205 can add the particular recommender to a set of trusted recommenders.

In some embodiments, the user can also select to remove or "de-friend" one of the recommenders via a gesture or other interaction with the electronic device 205. For example, the user may remove a specific recommender if the user does not want to receive recommendations from the specific recommender. The electronic device 205 optionally provides (not shown) details of any recommendation interactions to the recommendation server 203. Particularly, the electronic device 205 can send indications of any selected recommenders, any removed or de-friended recommenders, the amount of times that a recommender has been selected, or other data. The recommendation server 203 can maintain a rating or similar influence metric that can indicate how much a particular recommender's recommendations influence other users' decisions to download or reject updates to applications.

In some embodiments, the user of the electronic device 205 can select to initiate (228) an interaction with the first recommender, or another recommender, either prior to or after instructing the electronic device to download the update. In some cases, the electronic device 205 can display a visual indicator that indicates that the first recommender is currently online. Accordingly, the electronic device 205 can interface with the messaging server 204 to initiate a chat interface or similar communication interface that enables the user to communicate with a selected recommender and in some cases to obtain more detailed information about the update to the application. In some cases, the subject line of the chat interface can be pre-populated with an indication of the application update. It should be appreciated that other communication interfaces and protocols are envisioned, such as a message or e-mail exchange, a phone call, and/or others.

If the recommendation (220) is from a guru or trusted recommender ("YES"), the electronic device 205 can directly request (230) the update from the application server 202. The electronic device 205 can also request the update from the application server 202 in response to receiving from the user the instruction to download the update. Further, the electronic device 205 can request the update from the application server 202 with user interaction if a threshold number of recommenders have positively recommended the update. In some cases, such as when the recommendation is from a guru or trusted recommender, the electronic device 205 can annunciate (e.g., via a pop-up notification) an indication of the update notification and positive recommendation in a user interface, and can enable the user of the electronic device 205 to confirm to download the update. In some cases, the electronic device 205 can annunciate the indication for a threshold period of time (e.g., 10 seconds) along with an option to reject the update download, whereby the electronic device 205 can request (230) the update if the user does not reject the download option during the threshold period of time.

Responsive to receiving the request, the application server 202 can send (232) the update to the electronic device 205. Further, the electronic device 205 can install (234) the update received from the application server 202. According to embodiments, the electronic device 205 can install the update automatically, can queue the update for a later installation, or can wait for a selection from the user to install the update. The electronic device 205 can launch (236) the application after installing the update. In some cases, the electronic device 205 can annunciate a notification in the user interface that the application has been updated. Further, the annunciated notification can include an identification of an appropriate recommender, such as in cases in which the electronic device 205 automatically downloads and installs an update based on a positive recommendation from a guru or trusted recommender without prior user interaction.

As shown in FIG. 2, the electronic device 205 can optionally send (238) recommendation data for the update to the recommendation server 203. In embodiments, the user of the electronic device 205 can explicitly recommend the update or a recommendation can be implied from a user's behavior. For example, the electronic device 205 can automatically send a positive (implicit) recommendation responsive to the electronic device launching the updated application a threshold number of times or the application being active a threshold amount of time. Further, the electronic device 205 can identify that its user is using the application and can accordingly send, to the recommendation server 203, an indication of the recommender who influenced the user to download the update such that the recommender can receive credit, incentives, or other benefits.

The electronic device 205 can optionally provide (240) data of any recommendation activity to the developer entity 201. In some cases, the recommendation activity can include which users have positively or negatively rated an application update. Further, the recommendation activity can include a rating or similar performance metric that can indicate how much a particular recommender's recommendations influence other users' decisions to download a particular update. Still further, the recommendation activity can include indications of which recommenders are gurus or trusted recommenders, as well as the number of users that each guru or trusted recommender influences. The developer entity 201 can provide incentives to various users, such as trusted recommenders, based on the recommendation activity. For example, the incentives can include early or free access to beta versions of applications and/or updates, monetary payments, or other incentives. In some embodiments, the electronic device 205 can, after a period of time, determine the frequency with which the user is accessing or otherwise using the updated application. The electronic device 205 can provide such use data to the developer entity 201, recommendation server 203, and/or another entity.

FIGS. 3A, 3B, 4A, and 4B illustrate example interfaces associated with the execution, facilitation, and implementation associated with the embodiments as discussed herein. According to embodiments, an electronic device (such as any of the electronic devices 105, 106, 107) can display the example interfaces as a functionality of an operating system or of a dedicated application of the electronic device. The data associated with the example interfaces can be transmitted to, received from, and/or synchronized with one or more servers or entities, such as the developer entity 101, the application server 102, the recommendation server 103, and the messaging server 104. It should be appreciated that the interfaces of FIGS. 3A, 3B, 4A, and 4B are merely examples and can include other various details, arrangements, and/or selectable options.

Referring to FIG. 3A, depicted is an electronic device 305 with an example interface 351 associated with the embodiments as described herein. As shown in FIG. 3A, the interface 351 includes an indication 355 of an application with an available update (as shown: "Imaging Application"). The indication 355 includes an update option 356 and a reject option 357. Particularly, the electronic device 305 can initiate a download and install of the application update in response to a user selecting the update option 356 and can exit out of the interface 351 (or otherwise not download the application update) in response to the user selecting the reject option 357. Additionally, the user can select the ratings icon 370 to obtain rating and review details such as a more detailed rating summary, a ratings breakdown, and individual reviewer comments. Also, the user can select the application icon 375 to view additional description regarding the application, see screen shots of the application, and view a demonstration video of the application.

The interface 351 further includes indications 350, 352 of recommendations of the application update from recommenders associated with the user of the electronic device 205. Particularly, the indication 350 includes identifications(s) of recommender(s) who provide positive recommendations or ratings for the application update (as shown: "John Smith" and "Jane Doe") and the indication 352 includes identifications(s) of recommender(s) who provide negative recommendations or ratings for the application update (as shown: "Molly Jones"). The indications 350, 352 enable the user of the electronic device 305 to gauge how others have rated the particular update to the application.

For example, referring to FIG. 3A, the user may deduce that the update to the imaging application may be worth installing specifically because John Smith and Jane Doe, who are personally known to the user as having similar digital camera experiences as the user, have positively recommended the update while only one recommender has negatively recommended the update. According to embodiments, recommenders included in the indications 350, 352 can be connected to or associated with the user of the electronic device 305 via a social connection, as discussed herein. As another example, the user may not personally know Molly Jones and instead "follows" Molly as a photographer who produces beautiful, high-quality images. Because the user knows that Molly Jones is a professional photographer, the user may feel confident in discounting Molly's negative recommendation regarding amateur photography software. In some embodiments, although not shown in FIG. 3B, the indications 350, 352 can include identifications of non-human entities, such as various publications, websites, reviewers, and the like as selected by the user as recommenders. For example, the indications 350, 352 can include an identification of a technology website that recommends or reviews applications and updates thereof.

The electronic device 305 can be configured to send recommendation data to an external server (such as the recommendation server 203 as discussed with respect to FIG. 2) based on user selections or interactions within the interface 351. For example, if the user selects an identification 354 for John Smith followed by the update option 356, the electronic device 305 can send data to the external server indicating the selection of John Smith as an individual that influenced the user to download the update. For further example, if the user selects an identification 359 for Molly Jones followed by the reject option 357, the electronic device 305 can send data to the external server indicating the selection of Molly Jones as an individual that influenced the user to reject the update. Accordingly, the external server can upgrade John Smith (or Molly Jones) with a "point" or other incentives that can be used to award John Smith (or Molly Jones) with trusted recommender status relative to the user of the electronic device, or with other rewards. In some embodiments, the interface 351 can enable the user to select one of the recommender identifications to either initiate an update download or reject the update download, without the user having to also select the according option 356 or 357.

According to embodiments, the user can also interact with the interface 351 to "remove" an identification of a particular recommender. In particular, the user can select an identification and then "swipe" the identification to a location outside a particular indication 350, 352. As shown in FIG. 3A, the user selects the identification 359 of Molly Jones and then removes (358) the identification 359 from the indication 352.

In response to removing a particular identification, the electronic device 305 can send data to the external server that instructs the external server to not include the particular entity as a recommender for future application updates.

It should be appreciated that the electronic device 305 can order or arrange the identifications of the recommenders in the interface 351 according to any convention or technique. In some cases, the user of the electronic device 305 can have multiple gurus or trusted recommenders, and the electronic device 305 can arrange the identifications of the multiple gurus according to their ranking and/or an amount of "points" that the trusted recommenders have (either total points from all users or points awarded by the user of that electronic device 305).

Referring to FIG. 3B, depicted is the electronic device 305 with an example interface 353 associated with the embodiments as described herein. As shown in FIG. 3B, the interface 353 includes a chat interface 360 that enables the user of the electronic device 305 to chat or converse with recommenders. In embodiments, the electronic device 305 can display the chat interface 360 in response to the user of the electronic device 305 selecting an indication of one of the recommenders in the interface 351 as shown in FIG. 3A. Particularly, the user can select the identification 354 for John Smith, and the chat interface 360 can enable the user to chat with John Smith.

As shown in FIG. 3B, the chat interface 360 includes a chat box 361 into which the user can input text according to conventional techniques. The chat interface 360 further includes an example chat history 364 indicating prior messages exchanged between the user and John Smith regarding the update to the application corresponding to the indication 355 of FIG. 3A. The chat interface 360 further includes an update option 362 and a cancel option 363. Particularly, the electronic device 305 can initiate a download and install of the application update in response to the user selecting the update option 362 and can exit out of the chat interface 360 (or otherwise not download the application update) in response to the user selecting the cancel option 363.

Referring to FIG. 4A, depicted is an electronic device 405 with an example interface 464 associated with the embodiments as described herein. In particular, the electronic device 405 can display the interface 464 in cases in which the user of the electronic device 405 has specified a guru or trusted recommender to recommend application updates. As shown in FIG. 4A, the interface 464 includes a notification 465 indicating that the user's guru ("John Smith") has recommended the update to the example Meetup application and notifying the user that the electronic device 405 will download and install the update. The notification 465 includes an okay selection 466 that enables the user to acknowledge the content of the notification 465. In embodiments, if the user of the electronic device 405 has multiple gurus and at least two of the gurus conflict on a particular update recommendation, the electronic device 405 can bypass displaying the notification 465 and can instead display the interface 351 as discussed with respect to FIG. 3A.

Referring to FIG. 4B, depicted is an electronic device 405 with an example interface 470 associated with the embodiments as described herein. In particular, the electronic device 405 can display the interface 470 in cases in which the user of the electronic device 405 has specified a guru or trusted recommender to recommend application updates, and in which the electronic device 405 enables the user to cancel a download and installation of a certain application update. As shown in FIG. 4B, the interface 470 includes a notification 467 indicating that the user's guru ("John Smith") has recommended the update to the example Meetup application and enabling the user to select a cancel option 468 within ten seconds if the user wishes to cancel the update. In response to the user selecting the cancel option 468, the electronic device 405 can forego downloading and installing the update to the application. Conversely, if the user does not select the cancel option 468, or if the user selects an update option 469, then the electronic device 405 can download and install the update.

Figure 5:
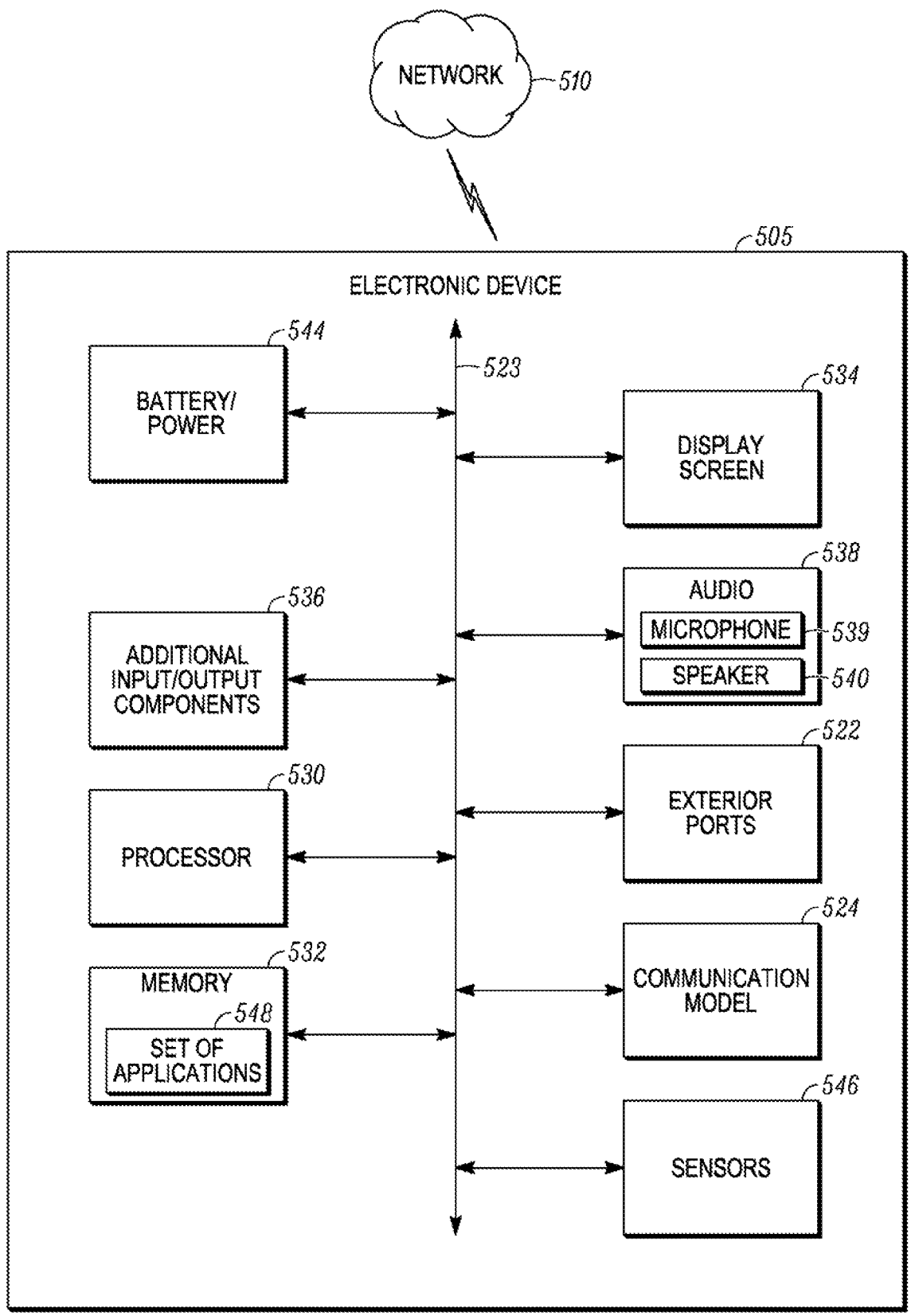
FIG. 5 is a block diagram of an electronic device in accordance with some embodiments.

FIG. 5 illustrates an example electronic device 505 (such as the electronic device 105 as discussed with respect to FIG. 1) in which the aspects may be implemented. The electronic device 505 can include a processor 530, a memory 532 (e.g., hard drives, flash memory, MicroSD cards, and others), a power module 544 (e.g., batteries, wired or wireless charging circuits, etc.), and one or more external ports 522 (e.g., cellular input and output, Universal Serial Bus (USB), HDMI, IEEE 1394, and/or others), each configured to communicate via a communication bus 523. The processor 530 can interface with the memory 532 to execute a set of applications 548 capable of facilitating the functionalities as discussed herein.

The electronic device 505 can further include a communication module 524 configured to interface with the one or more external ports 522 to communicate data via one or more networks 510. For example, the communication module 524 can include one or more transceivers functioning in accordance with IEEE standards, 3GPP standards, or other standards, and configured to receive and transmit data via the one or more external ports 522. More particularly, the communication module 524 can include one or more WWAN transceivers configured to communicate with a wide area network including one or more cell sites or base stations to communicatively connect the electronic device 505 to additional devices or components. Further, the communication module 524 can include one or more WLAN and/or WPAN transceivers configured to connect the electronic device 505 to local area networks and/or personal area networks, such as a Bluetooth® network.

The electronic device 505 can further include one or more sensors 546 such as, for example, imaging sensors, accelerometers, and other sensors. The electronic device 505 can include an audio module 538 including hardware components such as a speaker 540 for outputting audio and a microphone 539 for receiving audio. The electronic device 505 may further include one or more display screen 534, and additional I/O components 536 (e.g., capacitive or resistive touch sensitive input panels, keys, buttons, lights, LEDs, cursor control devices, haptic devices, and others). The display screen 534 and the additional I/O components 536 may be considered to form portions of a user interface (e.g., portions of the electronic device 505 associated with presenting information to the user and/or receiving inputs from the user).

In embodiments, the display screen 534 is a touchscreen display using singular or combinations of display technologies such as electrophoretic displays, electronic paper, polyLED displays, OLED displays, AMOLED displays, liquid crystal displays, electrowetting displays, rotating ball displays, segmented displays, direct drive displays, passive-matrix displays, active-matrix displays, and/or others. Further, the display screen 534 can include a thin, transparent touch sensor component superimposed upon a display section that is viewable by a user. For example, such displays include capacitive displays, resistive displays, surface acoustic wave (SAW) displays, optical imaging displays, and the like.

In general, a computer program product in accordance with an embodiment includes a computer usable storage medium (e.g., standard random access memory (RAM), an optical disc, a universal serial bus (USB) drive, or the like) having computer-readable program code embodied therein, wherein the computer-readable program code is adapted to be executed by the processor 530 (e.g., working in connection with an operating system) to implement a user interface method as described below. In this regard, the program code may be implemented in any desired language, and may be implemented as machine code, assembly code, byte code, interpretable source code or the like (e.g., via C, C++, Java, Actionscript, Objective-C, Javascript, CSS, XML, and/or others).

Figure 6:
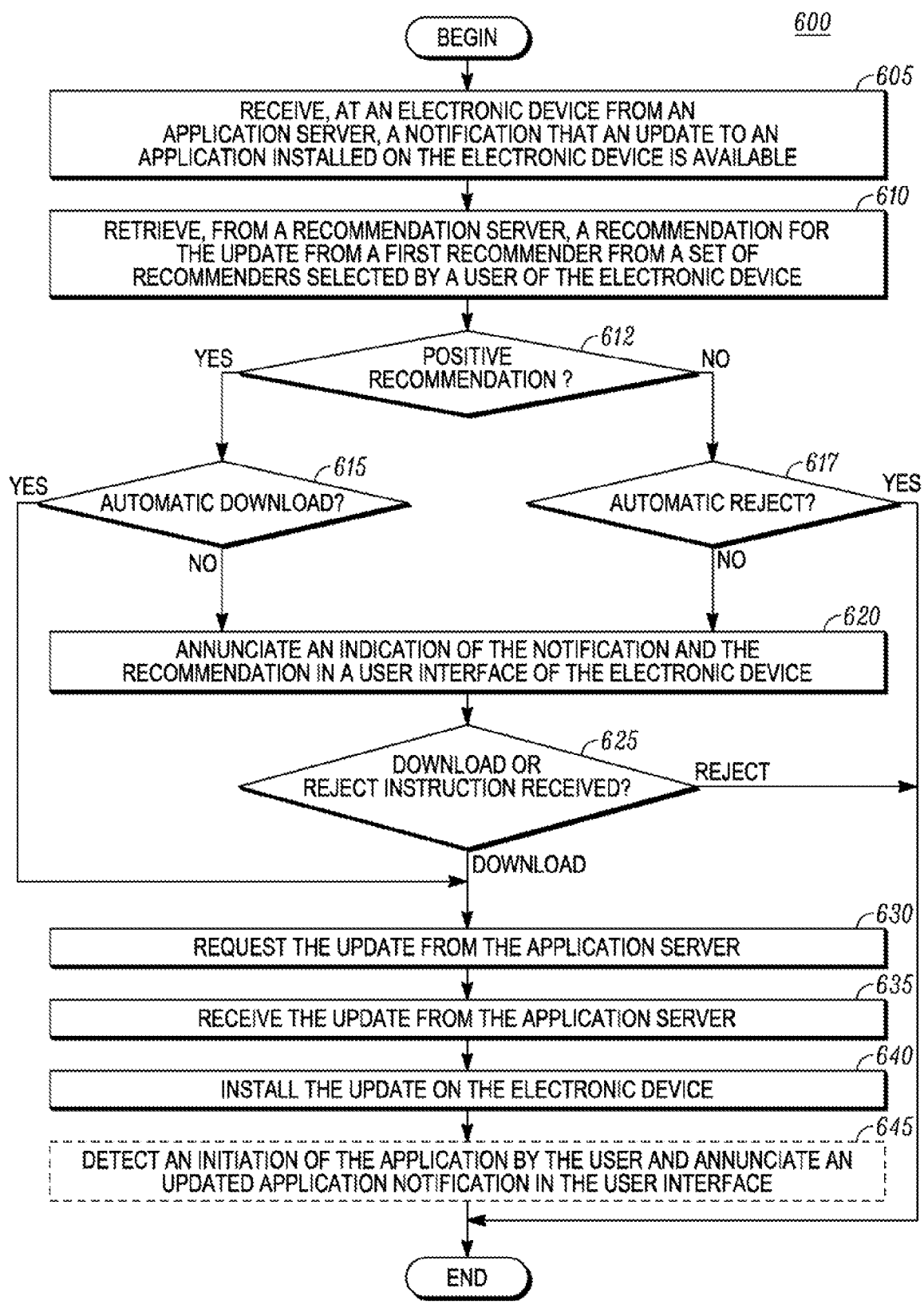
FIG. 6 depicts a flow diagram of downloading application updates in accordance with some embodiments.

FIG. 6 is a flowchart of a method 600 for an electronic device (such as the electronic device 105 as described with respect to FIG. 1) to download an update to an application installed on the electronic device. The method 600 begins with the electronic device receiving 605, from an application server, a notification that the update to the application installed on the electronic device is available. In embodiments, this notification is not annunciated to the user of the electronic device at this point in time. The electronic device retrieves 610, from a recommendation server, a recommendation for the update from a first recommender from a set of recommenders selected by a user of the electronic device. According to embodiments, the set of recommenders can be connected to or otherwise associated with the user within a social network service, a professional network service, an employer or university network, an accessible contact list, and the like. In some embodiments, the electronic device user can select a guru from the set of recommenders or can develop a trusted recommender by, for example, rating the first recommender positively a threshold number of times. The first recommender may be a guru or trusted recommender. The electronic device determines 612 whether the recommendation is positive. In particular, the electronic device determines whether the first recommender has positively recommended the update or negatively recommended the update.

If the recommendation is positive (612 "YES"), the electronic device determines 615 whether to automatically download the update based on the positive recommendation. Similarly, if the recommendation is not positive (i.e., is negative) (612 "NO"), the electronic device determines 617 whether to automatically reject the update based on the negative recommendation. In some cases, the automatic download or reject determinations can be based on whether the first recommender is a guru or a trusted recommender of the user of the electronic device. If the electronic device determines to automatically reject the update (step 617 "YES"), processing can end, repeat, or return to any previous functionality. If the electronic device determines to not automatically download the update (615 "NO") or to not automatically reject the update (617 "NO"), the electronic device annunciates 620 an indication of the notification and the recommendation in a user interface of the electronic device. For example, the indication can be annunciated as a pop-up window in the user interface. In embodiments, the electronic device can annunciate multiple recommendations received from the set of recommenders.

The electronic device receives an instruction from the user interface and determines 625 whether the received instruction is to reject the update or to download the update from the application server. In embodiments, the electronic device can receive the instruction via a user selection (as described with reference to FIGS. 3A, 4A, and 4B) or via a timeout (as described with reference to FIG. 4B) of the annunciated indication. If the instruction is to reject the update (625 "REJECT"), processing can end, repeat, or return to any previous functionality.

If the instruction is to download the update (625 "DOWNLOAD") or if the electronic device determines to automatically download the update (615 "YES"), processing can proceed to 630 in which the electronic device can request the update from the application server. The electronic device receives 635 the update from the application server. In embodiments, the electronic device can request and receive the update via any type of network connection or communication, as discussed herein. The electronic device installs 640 the update on the electronic device. According to embodiments, the electronic device can install the update immediately or queue the update for a later installation (e.g., at night, when the electronic device is charging, etc.). The electronic device optionally detects 645 an initiation of the application by the user and annunciates an updated application notification in the user interface when the application is launched. For example, the electronic device can display a pop-up window that informs the user that the update to the application has been installed. The pop-up window can include the recommender identification (similar to identification 354 of FIG. 3) and update features as noted by the software developer. This may enable the user to increase or decrease trust in the recommender for future decision making.

Figure 7:
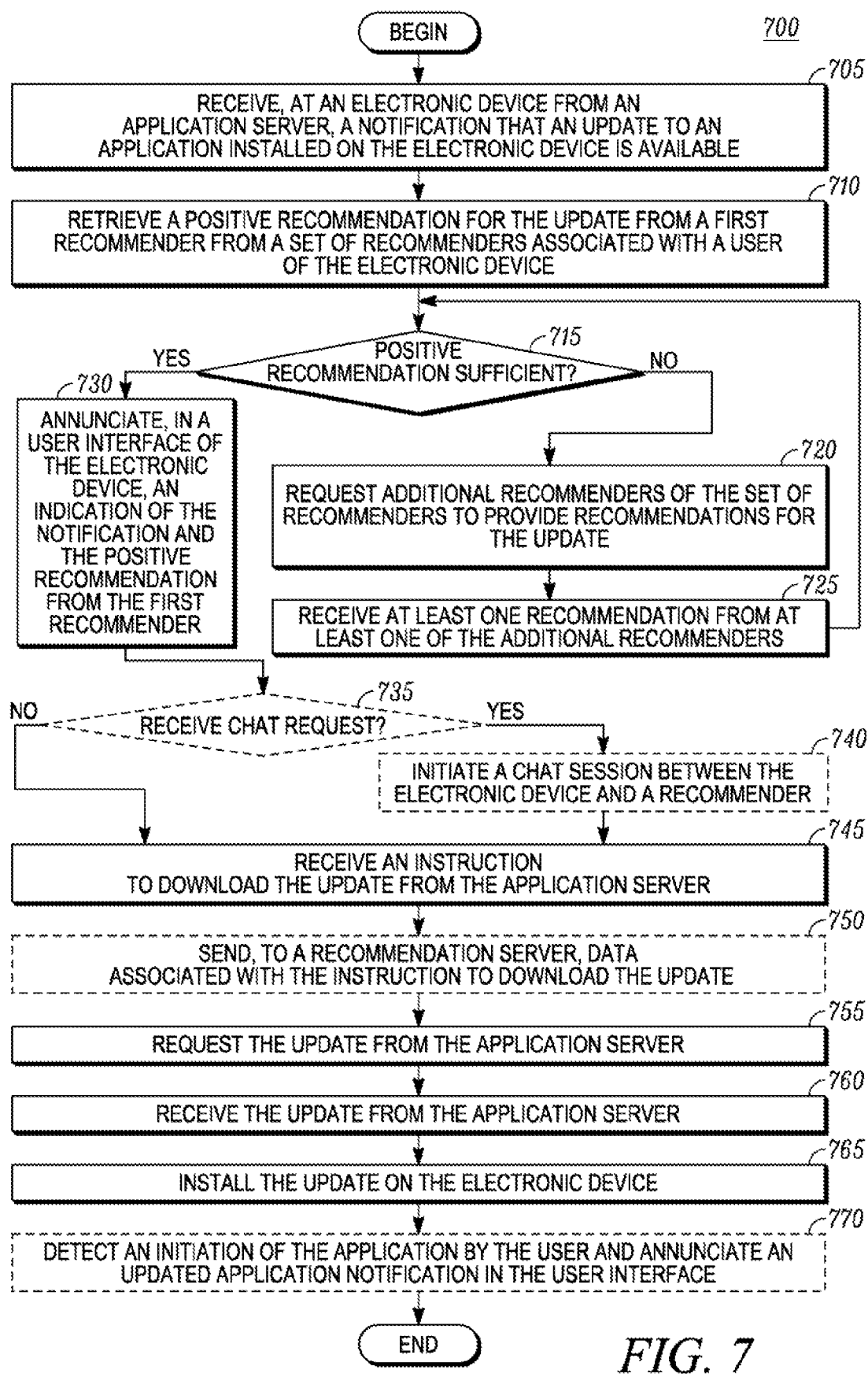
FIG. 7 depicts a flow diagram of downloading application updates in accordance with some other embodiments.

FIG. 7 is a flowchart of a method 700 for an electronic device (such as the electronic device 105 as described with respect to FIG. 1) to download an update to an application installed on the electronic device. The method 700 begins with the electronic device receiving 705, from an application server, a notification that the update to the application installed on the electronic device is available. In embodiments, this notification is not annunciated to the user of the electronic device at this point in time. The electronic device retrieves 710 a positive recommendation for the update from a first recommender from a set of recommenders associated with a user of the electronic device. According to embodiments, the set of recommenders can be connected to or otherwise associated with the user within a social network service, a professional network service, an employer or university network service, an accessible contacts list, and the like.

The electronic device determines 715 whether the positive recommendation is sufficient. In some cases, the positive recommendation can be sufficient if a threshold number of recommendations are received from a certain amount (minimum number and/or minimum percentage) of the set of recommenders. If the positive recommendation is not sufficient (715 "NO"), the electronic device requests 720 additional recommenders of the set of recommenders to provide recommendations for the update. In embodiments, the electronic device can send messages to the additional recommenders indicating a request for recommendations. The electronic device next receives 725 at least one recommendation from at least one of the additional recommenders. Processing can return to 715 wherein the electronic device determines if the recommendation(s) is sufficient. Note that, in some situations, the recommendations will never be sufficient because the minimum amount of positive recommendations is never achieved.

If the positive recommendation is sufficient ("YES"), the electronic device annunciates 730, in a user interface of the electronic device, an indication of the notification and the positive recommendation from the first recommender. For example, the indication can be annunciated as a pop-up window in the user interface. In embodiments, the electronic device can annunciate multiple recommendations received from the set of recommenders. The electronic device optionally determines 735 if a chat request has been received via the user interface. In embodiments, the user of the electronic device can request to chat with a recommender of the set of recommenders. If the chat request is received (735 "YES"), the electronic device optionally initiates 740 a chat session between the electronic device and a recommender. According to aspects, the user of the electronic device can further gauge a usefulness, a compatibility, or benefit of the update to the application via the chat session.

Subsequent to initiating the chat session or if the chat request is not received (735 "NO"), the electronic device receives 745 an instruction to download the update from the application server. In embodiments, the electronic device can receive the instruction via a user selection or via a timeout of the annunciated indication. The electronic device optionally sends 750, to a recommendation server, data associated with the instruction to download the update. In some cases, the data can include an identification of a recommender removed from the set of recommenders, added to the set of recommenders, or otherwise selected by the user.

The electronic device requests 755 the update from the application server. The electronic device next receives 760 the update from the application server. In embodiments, the electronic device can request and receive the update via any type of network connection or communication, as discussed herein. The electronic device installs 765 the update on the electronic device. According to embodiments, the electronic device can install the update immediately or queue the update for a later installation (e.g., at night, when the electronic device is charging, etc.). The electronic device optionally detects 770 an initiation of the application by the user and annunciates an updated application notification in the user interface upon a launch of the application. For example, the electronic device can display a pop-up window that informs the user that the update to the application has been installed. The pop-up window can include the recommender identification (similar to the identification 354 of FIG. 3) if the user selected a recommender at the time of requesting the update installation. The pop-up window may also include features of the update as noted by the software developer. This may enable the user to increase or decrease trust in the recommender for future decision making.

It should be appreciated that the functionality as described with respect to FIGS. 6 and 7 may be combined to support automatic download or automatic rejection of the application update, such as when a guru or trusted recommender provides such a recommendation, or to support manual download or manual rejection of the application update in other situations. For instance, if the electronic device determines in 615 to not automatically download the update ("NO"), processing can proceed to 715 in which the electronic device determines if the positive recommendation is sufficient. For further instance, if the electronic device can retrieve a negative recommendation in 710 and determine if the negative recommendation is sufficient and/or receive a manual selection to reject the update, as discussed with respect to FIG. 6.

Thus, it should be clear from the preceding disclosure that the systems and methods offer improved application updating techniques. The systems and methods advantageously enable users to leverage recommendations of known or trusted recommenders to determine whether to download certain updates to applications. Further, the systems and methods advantageously enable application developers to receive relevant feedback for their application updates from recommenders who are known to influence the decisions of others.

This disclosure is intended to explain how to fashion and use various embodiments in accordance with the technology rather than to limit the true, intended, and fair scope and spirit thereof. The foregoing description is not intended to be exhaustive or to be limited to the precise forms disclosed.

Modifications or variations are possible in light of the above teachings. The embodiment(s) were chosen and described to provide the best illustration of the principle of the described technology and its practical application, and to enable one of ordinary skill in the art to utilize the technology in various embodiments and with various modifications as are suited to the particular use contemplated. All such modifications and variations are within the scope of the embodiments as determined by the appended claims, as may be amended during the pendency of this application for patent, and all equivalents thereof, when interpreted in accordance with the breadth to which they are fairly, legally and equitably entitled.

The invention claimed is:

1. A method in an electronic device, the method comprising:
   receiving, from an application server,
   a notification that an update to an application installed on the electronic device is available;
   retrieving, from a recommendation server, a recommendation for the update from a first recommender from a set of recommenders selected by a user of the electronic device;
   examining the recommendation to determine to download the update;
   responsive to the examining, requesting the update from the application server;
   receiving the update from the application server; and
   installing the update on the electronic device;
   suppressing any annunciation of an indication of the notification on a user interface of the electronic device.

2. The method of claim 1, further comprising:
   adding the first recommender to the set of recommenders by rating the first recommender positively a threshold number of times.

3. The method of claim 1, wherein the first recommender is designated as a trusted recommender by the user of the electronic device.

4. The method of claim 1, wherein the examining comprises:
   identifying the recommendation from the first recommender;
   annunciating an indication of the notification and the recommendation from the first recommender in a user interface of the electronic device; and
   receiving, from the user interface, an instruction to download the update from the application server.

5. The method of claim 4, further comprising:
   retrieving, from the recommendation server, a negative recommendation from a second recommender from the set of recommenders;
   annunciating the negative recommendation from the second recommender in the user interface; and
   receiving, from the user interface, the instruction to download the update from the application server.

6. The method of claim 1, further comprising:
   detecting an initiation of the application by the user; and
   responsive to the detecting, annunciating an updated application notification in a user interface of the electronic device.

7. The method of claim 6, wherein the updated application notification includes an identification of the first recommender.

8. A method in an electronic device, the method comprising:
   receiving, from an application server,
   a notification that an update to an application installed on the electronic device is available;
   retrieving, by a processor, a positive recommendation for the update from a first recommender from a set of recommenders associated with a user of the electronic device;
   examining the positive recommendation to determine that the update should not be downloaded automatically;
   responsive to the examining, annunciating, in a user interface of the electronic device, an indication of the notification and the positive recommendation from the first recommender; and
   receiving an instruction to download the update from the application server;
   suppressing any annunciation of an indication of the notification on a user interface of the electronic device.

9. The method of claim 8, wherein the indication of the positive recommendation includes (1) at least one identification of the first recommender, and (2) at least one rating of the update by the first recommender.

10. The method of claim 8, wherein the indication of the positive recommendation further includes:
    an endorsement for another application.

11. The method of claim 8, further comprising:
    requesting the update from the application server;
    receiving the update from the application server; and
    installing the update on the electronic device.

12. The method of claim 8, further comprising:
    retrieving, by the processor, a negative recommendation for the update from a second recommender of the set of recommenders;
    wherein the annunciating further comprises:
        annunciating the negative recommendation by the second recommender in the user interface.

13. The method of claim 8, wherein the retrieving the positive recommendation comprises:
    examining the positive recommendation to determine that the positive recommendation is insufficient;
    requesting additional recommenders of the set of recommenders to provide recommendations for the update; and
    receiving at least one recommendation from at least one of the additional recommenders.

14. The method of claim 8, further comprising:
    receiving, from the user interface, an instruction to chat with a recommender; and
    responsive to the receiving the instruction to chat, initiating a chat session between the electronic device and the recommender.

15. The method of claim 8, wherein the instruction includes an identification of the first recommender, and wherein the method further comprises:
    sending, to a recommendation server, the identification of the first recommender.

16. The method of claim 8, further comprising:
    detecting a gesture in the user interface to remove a recommender from the set of recommenders; and
    removing the recommender from the set of recommenders.

17. The method of claim 16, further comprising:
    sending, to a recommendation server, an identification of the recommender.

18. The method of claim 8, wherein the annunciating the indication of the notification and the positive recommendation comprises:
    examining the positive recommendation to determine that the positive recommendation is insufficient;
    suppressing the annunciating of the indication of the notification;

requesting additional recommenders of the set of recommenders to provide recommendations for the update;

receiving at least one recommendation from at least one of the additional recommenders; and repeating the suppressing, the requesting, and the receiving until the positive recommendation and the at least one recommendation that was received are sufficient.

19. The method of claim 8, further comprising:

adding the first recommender to a set of trusted recommenders by rating the first recommender a threshold number of times.

20. The method of claim 19, wherein the retrieving comprises:

identifying the positive recommendation from the first recommender;

annunciating, for a threshold period of time, an option to reject the update; and downloading the update from the application server if the update was not rejected during the threshold period of time.

* * * * *